United States Patent Office 3,827,867
Patented Aug. 6, 1974

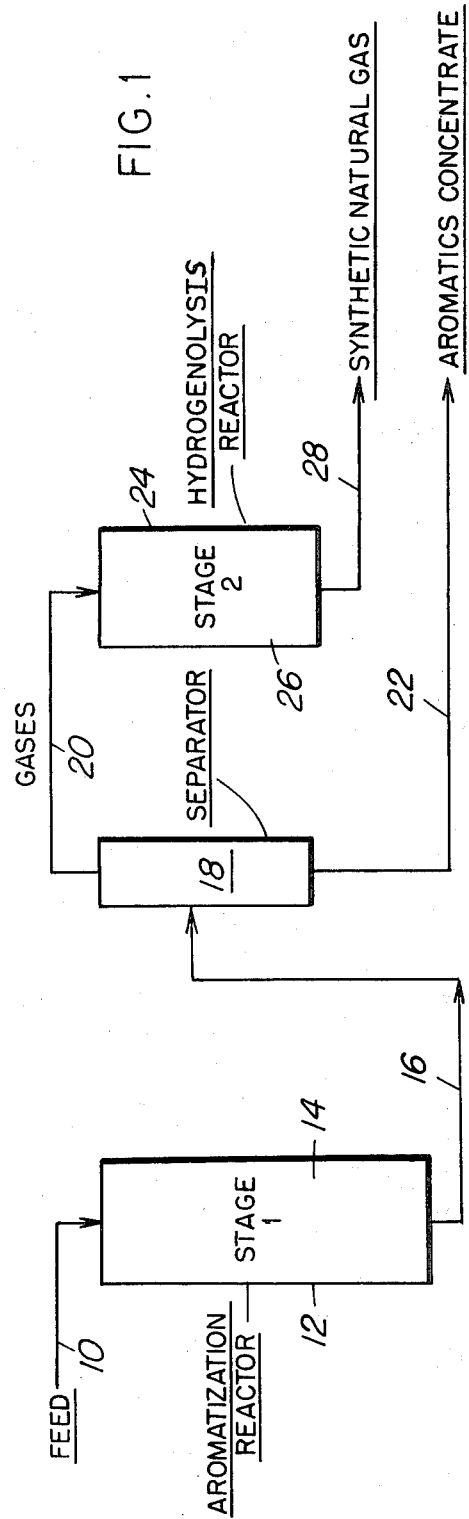
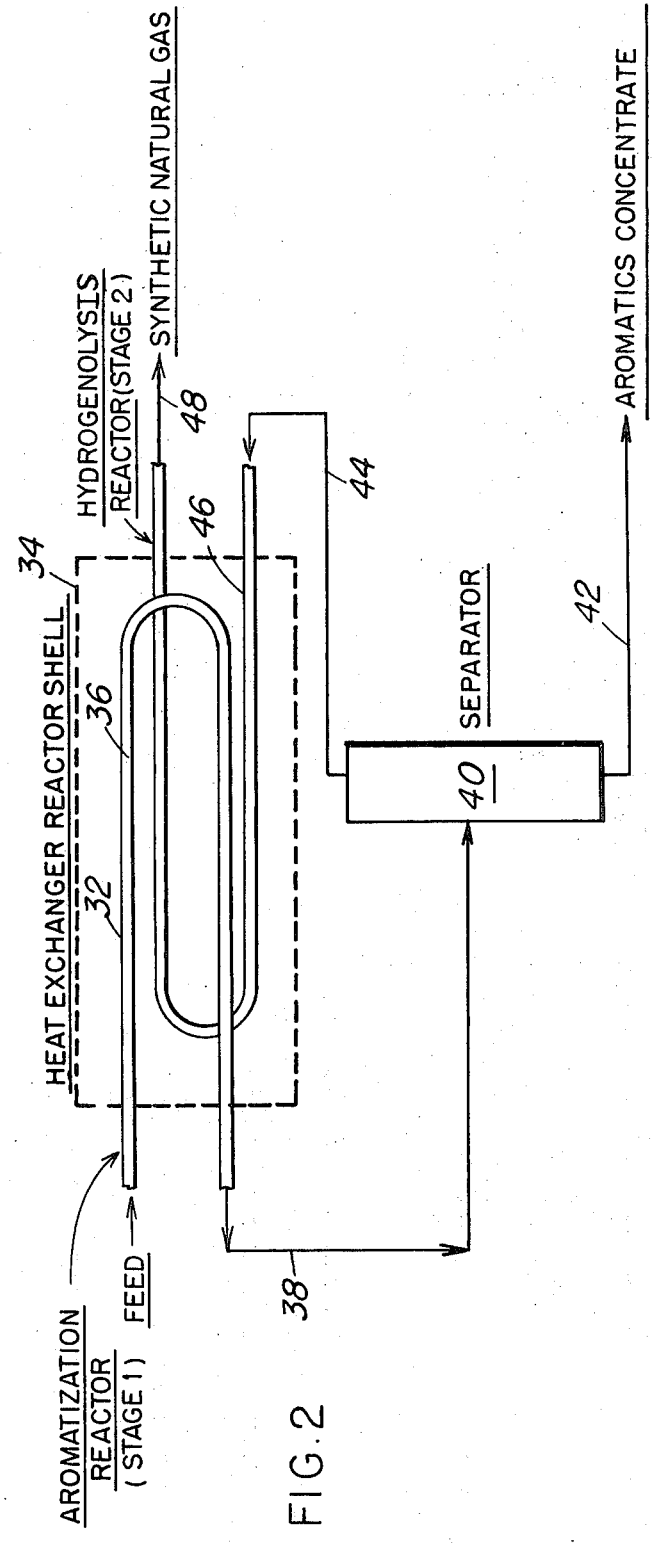

---

3,827,867
PRODUCTION OF METHANE AND AROMATICS
Heinz Heinemann, Princeton, N.J., and Paul B. Weisz, Lower Makefield Township, Pa., assignors to Mobil Oil Corporation, New York, N.Y.
Filed Nov. 16, 1972, Ser. No. 307,306
Int. Cl. C10g 11/28
U.S. Cl. 48—211
10 Claims

ABSTRACT OF THE DISCLOSURE

A combined aromatization and light gas hydrogenolysis whereby naphtha or light gas hydrocarbons are initially aromatized in contact with a ZSM-5 type of synthetic aluminosilicate zeolite molecular sieve under specified conditions to produce a product at least 30 weight percent of which is a mixture of aromatic hydrocarbons, and the remainder of which is a gaseous mixture of hydrogen and lower molecular weight hydrocarbons. The gaseous mixture is characterized by an atom ratio of about 1 carbon atom to 4 hydrogen atoms. This gas is contacted with a hydrogenolysis catalyst, such as nickel, at a temperature of about 525 to 1000° F. and a pressure of about 0 to 200 p.s.i.g. to convert at least most, and preferably substantially all of the hydrogen and the carbon in the hydrocarbon components to a synthetic natural gas which is thermally and physically compatible with natural gas.

---

This invention relates to petroleum processing. It more particularly refers to a process of upgrading relatively low octane petroleum fractions to produce product of substantially higher value.

It has recently been discovered that various relatively low octane petroleum fractions, that is, light gases, straight-run naphthas and other fractions having components boiling from $C_2$ to about 400° F., can be converted into products which are a mixture of very high octane liquids and low molecular weight gases. The liquid product is predominantly aromatic in nature and represents up to about 60% of the feed. The remaining 40% or more of the feed is evolved from this conversion as a gas whose principal components are hydrogen, methane, ethane and propane. Other paraffins may be present in this gaseous product in varying proportions depending upon the feedstock and upon the conversion conditions.

In the past these type conversions have been operated with a view toward maximizing the liquid product. The gas was considered undesired byproduct. Therefore, the operating parameters for the conversion, or more properly aromatization of aliphatic feeds, have been selected from a temperature range of about 650° F. to 1400° F., a pressure of about 1 to 30 atmospheres absolute, and a throughput rate corresponding to a space velocity of about 1 to 15 WHSV so as to convert at least 90% of the aliphatic, including naphthenic, components of the feed into a product having a liquid, or aromatics, yield of at least about 30 weight percent based on the aromatizable components of the feed. This process has been run with no hydrogen added to the feed, although it is recognized that the process is a hydrogen producer in that aromatization produces hydrogen as a byproduct and therefore hydrogen is indeed present in the reaction zone.

The aromatization process is carried out with a ZSM-5 type synthetic alumino silicate zeolite molecular seive catalyst.

The catalyst used for this known process has been stated to be a ZSM-5 type of catalyst which includes ZSM-5, ZSM-8, ZSM-11 and other similarly behaving zeolites.

ZSM-5 is disclosed and claimed in U.S. Pat. No. 3,702,-886, filed Oct. 10, 1969; ZSM-8 is disclosed and claimed in application Ser. No. 865,418, filed Oct. 10, 1969 and ZSM-11 is disclosed and claimed in application Ser. No. 31,421, filed Apr. 23, 1970, now Pat. No. 3,709,979.

The family of ZSM-5 compositions has the characteristic X-ray diffraction pattern set forth in Table 1 hereinbelow. ZSM-5 compositions can also be identified, in terms of mole ratios of oxides, as follows:

wherein M is a cation, n is the valence of said cation, W is selected from the group consisting of aluminum and gallium, Y is selected from the group consisting of silicon and germanium, z is from 0 to 40 and b is at least 5 and preferably 15–300. In a preferred synthesized form, the zeolite has a formula, in terms of mole ratios of oxides, as follows:

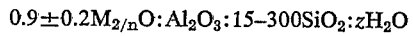

and M is selected from the group consisting of a mixture of alkali metal cations, especially sodium and tetraalkylammonium cations, the alkyl groups of which preferably contain 2–5 carbon atoms.

In a preferred embodiment of ZSM-5, W is aluminum, Y is silicon and the silica/alumina mole ratio is at least 15, preferably at least 30.

Members of the family of ZSM-5 zeolites which include ZSM-5, ZSM-8 and ZSM-11 possess a definite distinguishing crystalline structure whose X-ray diffraction pattern shows the following significant lines:

TABLE 1

| Interplanar spacing $d(A)$: | Relative intensity |
|---|---|
| 11.1±0.3 | S |
| 10.0±0.25 | S |
| 7.4±0.2 | W |
| 7.1±0.15 | W |
| 6.3±0.1 | W |
| 6.04±0.1 | W |
| 5.97±0.1 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.64±0.05 | M |
| 3.04±0.04 | W |
| 2.99±0.03 | W |
| 2.94±0.02 | W |

These values, as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, $100\ I/I_o$, where $I_o$ is the intensity of the strongest line or peak, and $d$(obs.), the interplanar spacing in A, corresponding to the recorded lines, were calculated. In Table 1 the relative intensities are given in terms of the symbols S=strong, M=medium, MS=medium strong, MW=medium weak and VS=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur, depending on the silicon to aluminum ratio of the particular sample, as well as if it has been subjected to thermal treatment.

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE 2

|  | Broad | Preferred | Particularly preferred |
|---|---|---|---|
| OH−/SiO₂ | 0.07–1.0 | 0.1–0.8 | 0.2–0.75 |
| R₄N + (R₄N⁺ + Na⁺) | 0.2–0.95 | 0.3–0.9 | 0.4–0.9 |
| H₂O/OH− | 10–300 | 10–300 | 10–300 |
| YO₂/W₂O₃ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90 to 150° C., with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM–5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM–5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM–5 composition will vary with the nature of the reaction mixture employed.

ZSM–8 can also be identified, in terms of mole ratios of oxides, as follows:

$$0.9 \pm 0.2 \; M_{2/n}O:Al_2O_3:15\text{--}300\,SiO_2:zH_2O$$

wherein M is at least one cation, n is the valence thereof and z is from 0 to 40. In a preferred synthesized form, the zeolite has a formula, in terms of mole ratios of oxides, as follows:

$$0.9 \pm 0.2 \; M_{2/n}O:Al_2O_3:15\text{--}60\,SiO_2:zH_2O$$

and M is selected from the group consisting of a mixture of alkali metal cations, especially sodium, and tetraethylammonium cations.

Zeolite ZSM–8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. 3,308,069. In general, however, it has been found that when tetraethylammonium hydroxide is employed, ZSM–8 can be prepared from said hydroxide, sodium oxide, aluminum oxide, silica and water by reacting said materials in such proportions that the forming solution has a composition in terms of mole ratios of oxides falling within the following ranges:

SiO₂/Al₂O₃—from about 10 to about 200
Na₂O/tetraethylammonium hydroxide—from about 0.05 to .020
Tetraethylammonium hydroxide/SiO₂—from about 0.08 to 1.0
H₂O/tetraethylammonium hydroxide—from about 80 to about 200.

Thereafter, the crystals are separated from the liquid and recovered. Typical reaction conditions consist of maintaining the foregoing reaction mixture at a temperature of from about 100° C. to 175° C. for a period of time of from about six hours to 60 days. A more preferred temperature range is from about 150 to 175° C. with the amount of time at a temperature in such range being from about 12 hours to 8 days.

ZSM–11 can also be identified, in terms of mole ratios of oxides, as follows:

$$0.9 \pm 0.3 \; M_{2/n}O:Al_2O_3:20\text{--}90\,SiO_2:zH_2O$$

wherein M is at least one cation, n is the valence thereof and z is from 6 to 12. In a preferred synthesized form, the zeolite has a formula, in terms of mole ratios of oxides, as follows:

$$0.9 \pm 0.3 \; M_{2/n}O:Al_2O_3:20\text{--}90\,SiO_2:zH_2O$$

and M is selected from the group consisting of a mixture of alkali metal cations, especially sodium, and tetrabutylammonium cations.

ZSM–11 can be suitably prepared by preparing a solution containing (R₄X)₂O, sodium oxide, an oxide of aluminum or gallium, an oxide of silicon or germanium and water and having a composition, in terms of mole ratios of oxides, falling within the following ranges:

|  | Broad | Preferred |
|---|---|---|
| YO₂/WO₂ | 10–150 | 20–90 |
| Na₂O/YO₂ | .05–0.7 | 0.05–0.40 |
| (R₄X)₂O/YO₂ | 0.02–0.20 | 0.02–0.15 |
| H₂O/Na₂O | 50–800 | 100–600 | wherein R₄X is a cation of a quaternary compound of an element of Group 5A of the Periodic Table, W is aluminum or gallium and Y is silicon of germanium maintaining the mixture until crystals of the zeolite are formed. Preferably, crystallization is performed under pressure in an autoclave or static bomb reactor. The temperature ranges from 100° C.–200° C. generally, but at lower temperatures, e.g. about 100° C. crystallization time is longer. Thereafter the crystals are separated from the liquid and recovered. The new zeolite is preferably formed in an aluminosilicate form.

An embodiment of this catalyst resides in the use of a porous matrix together with the ZSM–5 type family of zeolite previously described. The zeolite can be combined, dispersed, or otherwise intimately admixed with the porous matrix in such proportions that resulting products contain from 1 to 95% by weight and preferably from 10 to 70% by weight of the zeolite in the final composite.

The term "porous matrix" includes non-zeolite inorganic compositions with which the zeolites can be combined, dispersed or otherwise intimately admixed wherein the matrix may be catalytically active or inactive. It is to be understood that the porosity of the composition employed as a matrix can be either inherent in the particular material or it can be introduced by mechanical or chemical means. Represntative of matrices which can be employed include metals and alloys thereof, sintered metals, and sintered glass, asbestos, silicon carbide, aggregates, pumice, firebrick, diatomaceous earths,, alumina and inorganic oxides. In organic compositions, especially those comprising alumina and those of a siliceous nature are preferred. Of these matrices inorganic oxides such as clay, chemically treated clays, silica, silica alumina, etc. as well as alumina, are particularly preferred because of their superior porosity, attrition resistance and stability.

Techniques for incorporating the ZSM-5 type family of zeolites into a matrix are conventional in the art and are set forth in U.S. 3,140,253.

It is to be noted that when a ZSM-5 type zeolite is used in combination with a porous matrix, space velocities which may be set forth as parameters for this process are based on the ZSM-5 type zeolite alone and the porous matrix is ignored. Thus, whether a ZSM-5 type zeolite is used alone or in a porous matrix, the space velocities in all cases refer to the ZSM-5 type component.

It is known that zeolites, particularly synthetic zeolites can have their composition modified by impregnating certain metals thereonto and/or thereinto. The composition can also be modified by exchanging various anions and/or cations into the crystal structure of the zeolite, replacing more or less of the ions originally present upon production of the zeolite.

The ZSM-5 type family of zeolites have been found to be especially active for aromatization if they have at least a portion of the original cations associated therewith replaced by any of a wide variety of other cations according to techniques well known in the art. Typical replacing cations would include hydrogen, ammonium, and metal cations, including mixtures of the same. Of the replacing cations, preference is given to cations of hydrogen, ammonium, rare earth, magnesium, zinc, calcium, nickel and mixtures thereof. Particularly effective members of the ZSM-5 type family of zeolites are those which have been base exchanged with hydrogen ions, ammonium ions, zinc ions or mixtures thereof. Most especially zinc ZSM-5 is the best presently known catalyst for aromatizations as set forth.

Typical ion exchange techniques would be to contact a ZSM-5 type of zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. 3,140,249; 3,140,251; and 3,140,253.

It is also within the scope of the aromatization process to which this application is directed to incorporate a desired metallic component onto the ZSM-5 type family of zeolites by techniques other than ion exchange. Thus, for example, it is possible to impregnate a desired metallic component, such as zinc, platinum or palladium, thereinto by conventional impregnation techniques, as well as merely depositing the elemental metal onto the particular zeolite and in some cases, such as with zinc oxide, to incorporate the metal by physical admixture of the zeolite with an insoluble metal compound.

In any event, following contact with a salt solution of the desired replacing cation, the zeolites are preferably washed with water and dried at a temperature ranging from 150° to about 600° F. and thereafter heated in air or inert gas at temperatures ranging from about 150° to about 600° F. and thereafter heated in air or inert gas at temperatures ranging from about 500° F. to 1500° F. for periods of time ranging from 1 to 48 hours or more. It is noted that this heat treatment can be carried out in situ, i.e. while the particular aromatization reaction is taking place, but it is preferred to carry it out as a separate step prior to carrying out the aromatization reaction.

Natural gas, that is a gas composed principally of methane, is used in extremely large quantities for home heating and cooking and for the generation of electric power by utility companies. In recent times there have been more and more reports about shortages, both present and future, of natural gas. These shortages have impelled distributors of natural gas to seek out means for augmenting their supplies. One such means, currently practiced, is to purchase propane and to dilute the methane of the natural gas with this material. This practice is used particularly during periods of very high demand, and is sometimes referred to as "spiking." However, there are disadvantages to this practice. For one thing, the heating value of propane is higher than that of methane and therefore, since the burners are set to operate on methane, the amount that can be introduced without causing malfunctions of these burners and/or other inefficiencies in the system is very limited. Expressed in another way, propane has poor thermal compatibility with the methane of natural gas. In fact, in order to ameliorate the thermal incompatibility of propane with natural gas, to improve this situation somewhat, and permit the blending in of somewhat larger quantities of propane, it has become common practice to introduce air into the gas system along with the propane. This combined introduction of propane and air is sometimes referred to as "peak-shaving."

It is evident that the amounts and the manner of introduction of air must be very carefully controlled. Diluents other than air have been considered, for example, hydrogen; however, they suffer from similar problems of incompatibility with natural gas. Hydrogen has a heating value, on a volumetric basis, of about ⅓ that of natural gas.

In addition to the above limitations, the amount of propane that can be mixed with natural gas under high pressures, such as are encountered in pipeline transmission, are severely limited by the relatively easy liquifaction of propane. Stated another way, propane and natural gas have very limited physical compatibility.

In view of the present and prosepective shortages of natural gas and the difficulties of augmenting present supplies with various "extenders," such as propane, hydrogen, etc., it would be desirable to produce a synthetic natural gas consisting predominantly of methane. Of the utmost importance in producing this synthetic natural gas is the satisfaction of its thermal and physical compatibility with natural gas, whether as an alternative in the same burner system or as an extending admixture with natural gas.

It is therefore an object of this invention to provide a process for producing synthetic natural gas (SNG) from petroleum fractions in good yield.

It is another object of this invention to provide an improved process of converting relatively low value petroleum fractions to a combination of synthetic natural gas (methane) and aromatics.

It is a further object of this invention to provide a such improved process which is exceptionally well integrated in terms of product distribution.

Other and additional objects will become apparent from a consideration of this entire specification including the claims hereof.

In accord with and fulfilling these objects, one aspect of this invention resides in an integrated process in which a hydrocarbon feed of $C_5$ to $C_{12}$ range materials, which may be individual compounds, mixtures of such compounds, or boiling point cut petroleum fractions, is passed in contact with ZSM-5 type of catalyst at about 650 to 1500° F., low pressures of about 1 to 5 atmospheres absolute and low space velocities of about 0.1 to 15 WHSV under such combination of conditions as to substantially completely convert all of the non-aromatic components in the feed into a product which is about 45 to 65% liquid and 35 to 55% (the remainder) gas. The reaction conditions are chosen, within the parameters set forth above, so that the liquid product is at least 90% aromatic and has a clear research octane value of about 100. The gas produced consists preponderantly of a minor amount by weight of hydrogen admixed with propane and other normally gaseous hydrocarbons. The gas product may well contain sulfur values, usually as hydrogen sulfide and other minor constituents. It is most important that the initial aromatization reaction conditions be so chosen as to produce, along with the liquid product set forth above, a gas product that has an overall atom ratio of hydrogen to carbon of about 3.7 to 4.2, preferably about 4, depending on the particular charge stock and the particular combination of reaction conditions. In general, when a reaction parameter is varied in the first aromatization stage of the reaction such as to increase the severity of the reaction, i.e., if temperature is increased or WHSV is decreased, it will be found that the composition of the gaseous products will tend towards the upper end of the prescribed range; conversely with decreased severity, the composition will tend toward that lower end of the range. Thus, the aromatization conditions can be adjusted to precisely control the overall atom ratio of hydrogen to carbon in the gas product to be subsequently converted to the synthetic natural gas. Compositons of the gas within the range of 3.7 to 4.2 atom ratios of hydrogen to carbon are converted in the subsequent stage to synthetic natural gas containing relatively high purity methane having high compatibility with natural gas.

Various materials may be used as a source of the hydrocarbon feeds. In addition to using individual hydrocarbons, such as n-heptane, as the feed, mixed hydrocarbons or, preferably, unresolved petroleum refinery fractions can be used. These include straight run naphthas, catalytically cracked gasoline, coker gasoline, moderate to low olefins content pyrolysis gasoline, natural gas liquids and other similar materials. In general, the hydrocarbon feed to this process comprises paraffins, olefins and naphthenes. It may also contain aromatics. Since aromatic rings are substantially inert to the action of a ZSM-5 type of catalyst, under the aromatization conditions specified, these rings pass through the first stage of this process substantially without alteration.

Short side chains on the aromatics are similarly inert. However, long side chains may act as paraffins and get cracked from the aromatic rings and converted into other materials as if they were initially fed as paraffins.

As noted above, the aromatization portion of the process of this invention is carried out at at least 650° F. the exact temperature used for the aromatization is a function of the composition of the feed material. It is determined by the hydrogen content of the feed as aforesaid, and it is also to a very great extent controlled by the olefins content of the feed. Thus if the feed contains at least about 35 weight percent olefins, the operating temperature can be as low as about 650° F. On the other hand, if the feed contains less than about 35 weight percent olefins, the operating temperature for aromatization should be at least about 850° F.

The gas product produced by this aromatization stage, having a hydrogen to carbon ratio of about 3.7 to 4.2 as aforesaid, is removed from contact with the liquid product and is then contacted with a hydrogenolysis catalyst such as nickel, cobalt, platinum, ruthenium, etc. The second stage, hydrogenolysis process is suitably carried out at a temperature of about 525 to 1000° F., a pressure of about 1 to 14 atmospheres absolute and a space velocity of about 1 to 50 WHSV. The nickel or other catalyst is suitably solid and may be used in a fixed or fluidized bed arrangement. The catalyst may also be in the form of a coating on the reactor walls. Where a fluidized bed is used, the catalyst is suitably about 0.1 to 1.0 mm. particles whereas with a fixed bed system the catalyst is suitably pellets of about 0.2 to 0.5 cm. average diameter.

The product of the hydrogenolysis portion of this process is a synthetic natural gas consisting of about 90% methane. This gas product may also contain either a small amount of free hydrogen or a small amount of higher homologues of methane depending upon the atom ratio of the gas feed to hydrogenolysis. These "excess reactants" should be limited to below about 20 percent of the total product.

The charge stocks preferably have a combined or free hydrogen content of about 14 to 16.7 weight percent and 90% of the charge distills in the range of $C_3$ to 400° F. While the presence or absence of sulfur in the charge stock in any form appears to have little or no effect upon the activity and/or selectivity of the ZSM-5 type of catalyst, it not passing into the liquid, high octane gasoline product, sulfur values may have a detrimental effect upon the subsequent hydrogenolysis to which the gaseous product will be subjected. Therefore, if charge stocks have an unacceptable sulfur content, they may be hydrotreated to remove some or all of their sulfur. Such sulfur removal techniques are well known and widely practiced in the petroleum arts. It is also within the scope of this invention, if desired, to treat the gas product of aromatization by sorption or extraction with conventional means for removing sulfur values therefrom.

The first, or aromatization, stage preferred processing conditions and parameters which have been found to generate an exceptional cooperation between this first and the subsequent second, or hydrogenolysis stage are: temperature 975 to 1050° F., pressure 1 to 3 atm. abs., Zn ZSM-5 catalyst, 0.5 to 4 WHSV, 85 to 95% conversion, and 50 to 60% yield of liquid aromatics. The second, or hydrogenolysis, stage preferred processing conditions and parameters which have been found to generate an exceptional cooperation between this second and the prior first stage are: temperature 525 to 1000° F., pressure 1 to 14 atm. abs., nickel catalyst, 0.1 to 1.0 mm. catalyst particle diameter, 1 to 50 WHSV, 4 to 1 hydrogen to carbon ratio in feed.

It is known that the liquid product of the first or aromatization stage may, under some processing conditions, contain up to about 10% by weight $C_6^+$ aliphatics. Depending upon the use to which this liquid product will be put, it may be possible to simply leave these aliphatics in the liquid product. On the other hand, there are certain circumstances under which this condition is less than satisfactory. Thus, in the situation where relatively pure aromatics are desired, e.g. for further chemical use, the presence of the $C_6^+$ component may be detrimental to the liquid product. Further, since the $C_6^+$ component of the liquid product contains significant straight chain paraffinic, its octane value is quite low. Therefore, to maximize the gasoline blending value of the liquid product, it may be desirable to remove the $C_6^+$ aliphatic component therefrom. Still further, and possibly as a consequence of the first two propositions, under some circumstances it may be desirable to maximize the synthetic natural gas yield from the overall process, and/or the aromatization stage may have produced a gas product containing a higher atom ratio of hydrogen to carbon than the required or desired or set forth above for the hydrogenolysis stage. In this case, the $C_6^+$ aliphatics component of the liquid product may be both an excellent source of additional methane production capability.

It is therefore considered to be within the scope of this invention to provide a unit operation to which the liquid product of aromatization is subjected in order to separate at least some of the $C_6^+$ aliphatics therefrom. Processing of this type is per se known in the petroleum arts. One such known process utilizes liquid-liquid extraction to separate aromatics and aliphatics. Suitable solvents include diethylene glycol, sulfolane, sulfur dioxide and the like. These extraction processes operate at temperatures to 200° F. and ambient pressures and require several parts by volume of solvent per part of aromatic component of the liquid being extracted. The aromatics are recovered from this extraction process in 99+% purity while the $C_6^+$ aliphatic portion of the product is recovered in pure enough form to be recycled to the aromatization stage, sent to other refining processing such as cracking or, preferably vaporized and fed directly to the second stage hydrogenolysis portion of the instant process. The impure solvent stream is sent to distillation to recover and recycle the solvent.

The aromatics separated as liquid product from the process herein described can be utilized as such for gasoline blend stock or can be resolved, e.g. by multiple column distillation or extractive distillation, into various component chemicals, predominantly benzene, toluene, xylene and ethylbenzene, which chemicals have known utility as solvents or as intermediates for the production of other useful materials, such as styrene from ethylbenzene.

It is an important aspect of this invention that the two stages of the process described herein are thermally opposite. That is, the first stage is quite endothermic, while the second stage is quite exothermic. It is therefore within the purview of this invention to carry out the two stages in thermodynamic relationship utilizing the heat generated by the second stage to supply all or part of the heat necessary to carry out the first stage reaction. In the general case referred to herein, the first stage aromatization reaction requires the input of about 10 to 25 kcal. per 100 grams of feed while the second stage hydrogenolysis reaction of the gaseous effluent of the first stage produces about 17 to 25 kcal. on the same basis. Since they are produced by the combined process hereof, there is on balance a net energy efficiency of up to about 7 kcal. per 100 grams of feed.

This energy balance between the first and second stages can be accomplished in several different ways, many of which will be readily apparent to those of ordinary skill in the art once they have been instructed that such heat exchange is desirable. The heat exchange may be indirect, as for example, by means of using the second stage as a steam or Dowtherm boiler and heating the first stage by condensation of this steam or Dowtherm. Another technique would be to preheat the feed to the first stage in exchange with the product from the second stage. A further technique would be to carry out the two stages in a heat exchange relationship as for example, by carrying out the second stage reaction in tubular reactors located within the catalyst bed of the first stage reaction zone. Other alternatives will suggest themselves to those skilled in this art.

The process of this invention will be illustrated by the accompanying drawing in which:

FIG. 1 is a schematic flow diagram of this process; and
FIG. 2 is a schematic flow diagram of this process in a modified form.

Referring now to the drawing, and particularly to FIG. 1 thereof, a hydrocarbon feed 10 is introduced into a first stage reactor 12 containing ZSM–5 catalyst 14. The product 16 from the first stage reactor is mixed with highly aromatic liquid and gas comprising hydrogen and lower alkanes. This product 16 is fed to a gas-liquid separating means 18 in which it is separated into a gas fraction 20 and a liquid fraction 22. The gas fraction 20 is passed into a hydrogenolysis reactor 24 containing a hydrogenolysis catalyst 26. The product 28 emerging from this hydrogenolysis reactor 24 is synthetic natural gas.

Referring now to FIG. 2, a modified process according to this invention is shown in which the two stages are thermodynamically coupled. A hydrocarbon feed 30 is fed to a first stage tubular aromatization reactor 32 contained in a heat retaining housing 34 filled with a ZSM–5 catalyst 36. The product 38 emerging from this first stage tubular reactor is fed to a separating means 40 where it is resolved into a liquid product 42 and a gaseous intermediate 44. The gaseous intermediate, comprising hydrogen and alkanes, is fed to a second stage tubular hydrogenolysis reactor 46 located in the same housing 34 as, and in heat exchange relationship with, the first stage reactor 32 as, and in heat exchange relationship with, the first stage reactor 32. The product 48 from the second stage reaction is synthetic natural gas.

The following Examples are illustrative of the practice of this invention without being in any way limiting thereon Parts and percentages set forth herein are by weight unless expressly stated to be on some other basis.

EXAMPLE 1

A Coastal State's Light FCC (fluid catalytically cracked) gasoline was distilled, and the fraction in the $C_5$ to 230° F. boiling range was recovered. This recovered fraction, having 14.33 weight percent hydrogen content, and the following distribution of hydrocarbon types

| | Wt. percent |
|---|---|
| Paraffins | 34.1 |
| Olefins | 41.7 |
| Naphthenes | 14.0 |
| Aromatics | 10.2 | was introduced, without added hydrogen, into a first reaction zone maintained at a temperature of 1025° F. and 1 atm. absolute at a rate such that the space velocity was 1.80 WHSV. The reaction zone was packed with 8 parts of alumina bonded Zn ZSM–5 extrudate catalyst particles having a diameter of 1/16 inch. A total of 17 parts of hydrogen feed was passed through the reaction zone in three hours, during which time, a total of 11.4 parts of liquid product and 5.3 parts of gaseous product were recovered. A small fraction of the charge, about 0.3 parts, was converted to coke on the catalyst. Heat input required to maintain reaction temperature was about 2.7 kilocalories.

The liquid product, substantially a mixture of aromatic hydrocarbons, was found to contain 9.14 weight percent hydrogen. This liquid has a research octane number, clear, of about 106. The gaseous product consisted of:

| | Wt. percent |
|---|---|
| Hydrogen | 7.98 |
| Methane | 16.78 |
| Ethane | 24.69 |
| Ethylene | 4.63 |
| Propane | 32.73 |
| Propylene | 4.85 |
| Isobutane | 2.01 |
| N-butane | 1.00 |
| Butenes | 5.33 | with an overall calculated hydrogen content of 25.8 weight percent, i.e., it contained 4.14 atoms of hydrogen per atom of carbon.

The total gaseous product was forwarded to a second stage reaction zone, maintained at 1075° F., 7 atm. absolute, at a rate such that the space velocity was 40 WHSV. Cooling was required to maintain temperature, and about 3.5 kilocalories of heat was removed during the second stage conversion. The second reaction zone was packed with nickel catalyst in particles having an average size of 0.5 mm. The product evolved from the second reaction zone had the following approximate composition.

| | Mol percent |
|---|---|
| Methane | 89 |
| Hydrogen | 9 |
| Ethane-ethylene | 2 | i.e., a composition similar to, and compatible with, natural gas. The heating value of this composition is about 1012 B.t.u./s.f.c., about the same as pure methane, which has a heating value of 1060 B.t.u./s.f.c.

EXAMPLE 2

Example 1 was repeated under the same conditions except that the first stage weight hourly space velocity was 3.60 instead of 1.80. The result of this variant was to produce liquid product in the amount of 15.8 parts and 9.5 parts of gaseous product. The overall analysis of the liquid product showed it to have a hydrogen content of 9.51 weight percent. The gaseous composition had an overall hydrogen content corresponding to 3.61 atoms of hydrogen per atom of carbon, and consisted of a mixture of hydrocarbons especially rich in propane.

After passing through the second stage hydrogenolysis, operating at the same conditions as in Example 1, the gas product analyzed approximately:

| | Mol percent |
|---|---|
| Methane | 86 |
| Ethane-ethylene | 7 |
| Propane | 7 |

This composition has a heating value of 1223 B.t.u./s.c.f., only slightly higher than natural gas. The heat required in the first stage of the conversion is somewhat less than that removed from the second stage.

EXAMPLE 3

Example 1 was repeated except that the charge was fed at a WHSV of 8.98 instead of 1.80. The overall composition of the gaseous products contained an average of only 2.85 atoms of hydrogen per atom of carbon, which is unsatisfactory for the purpose of subsequent hydrogenolysis to methane.

What is claimed is:

1. A process of producing methane and aromatics from a feedstock comprising one or more $C_2$ to 400° F. aliphatics which process comprises introducing said feedstock into a first reaction zone at a space velocity equivalent to about 0.1 to 15 WHSV; maintaining said first reaction zone at about 650° F. to 1500° F. and 1 to 30 atm. abs., said space velocity, temperature and pressure constituting the operating parameters of said first reaction zone; contacting said feedstock with a ZSM-5 type of synthetic aluminosilicate molecular sieve catalyst in said first reaction zone under a combination of said operating parameters sufficient to produce a predominantly aromatic liquid product and a gaseous product which is predominantly hydrogen and paraffins of less than about 6 carbon atoms in an atom ratio of about 3.7 to 4.2 hydrogen to carbon; introducing said gaseous product into a second reaction zone at a space velocity equivalent to about 1 to 50 WHSV; maintaining said second reaction zone at about 525 to 1000° F. and 1 to 14 atm. abs.; and contacting said gaseous product with a hydrogenolysis catalysis in said second reaction zone, whereby to produce a synthetic natural gas product which is physically and thermally compatible with natural gas.

2. A process as claimed in Claim 1 wherein said synthetic natural gas comprises at least about 85% methane.

3. A process as claimed in Claim 1 wherein said feedstock contains aromatics.

4. A process as claimed in Claim 1 wherein said feedstock comprises $C_5$ to $C_{12}$ aliphatics.

5. A process as claimed in Claim 2 including converting at least 90% of the non-aromatic portion of said feedstock in said first reaction zone.

6. A process as claimed in Claim 1 wherein said first reaction zone liquid product contains up to 10% $C_6^+$ aliphatic compounds therein, and including separating said $C_6^+$ aliphatics from aromatics present in said liquid product.

7. A process as claimed in Claim 6 including vaporizing and feeding said $C_6^+$ aliphatics to said second reaction zone.

8. A process as claimed in Claim 1 wherein said feedstock has a hydrogen content of about 14 to 16.7 weight percent.

9. A process as claimed in Claim 1 wherein said first reaction zone is maintained at about 975 to 1050° F., 1 to 3 atmospheres absolute and 0.5 to 4 WHSV and utilizes a zinc ZSM-5 catalyst to convert about 85 to 95% of said feedstock to a product about 50 to 60% of which is aromatic.

10. A process as claimed in Claim 9 wherein the first zone gaseous product has a hydrogen to carbon ratio of about 4 and said second zone contains a nickel hydrogenolysis catalyst.

References Cited
UNITED STATES PATENTS

| 3,761,389 | 9/1973 | Rollmann | 208—64 |
| 3,421,870 | 2/1964 | Sinfelt et al. | 48—213 |
| 2,734,809 | 2/1956 | Pettyjohn et al. | 48—197 |

ROBERT L. LINDSAY, JR., Primary Examiner

P. F. KRATZ, Assistant Examiner

U.S. Cl. X.R.

48—197 R, 213; 260—673, 676

PO-1050
(5/69)

UNITED STATES PATENT OFFICE
CERTIFICATE OF CORRECTION

Patent No. 3827867      Dated August 6, 1974

Inventor(s) HEINZ HEINEMANN and PAUL B. WEISZ

It is certified that error appears in the above-identified patent and that said Letters Patent are hereby corrected as shown below:

| | |
|---|---|
| Column 5, lines 62, 63, 64 | "and thereafter heated in air or inert gas temperatures ranging from about 150° to about 600°F" should be deleted. |
| Column 6, line 37 | "prosepective" should be --prospective--. |
| Column 7, line 13 | After the word "creased," the following phrase should be added --or the pressure is increased--. |
| Column 7, line 17 | After "aromatization" insert --reaction--. |
| Column 10, lines 23 and 24 | "hydrogen" should be --hydrocarbon--. |

Signed and sealed this 22nd day of October 1974.

(SEAL)
Attest:

McCOY M. GIBSON JR.
Attesting Officer

C. MARSHALL DANN
Commissioner of Patents